Dec. 7, 1926.  1,609,548
C. F. HUSSEY
MEASURING APPARATUS
Original Filed August 12, 1922   2 Sheets-Sheet 1
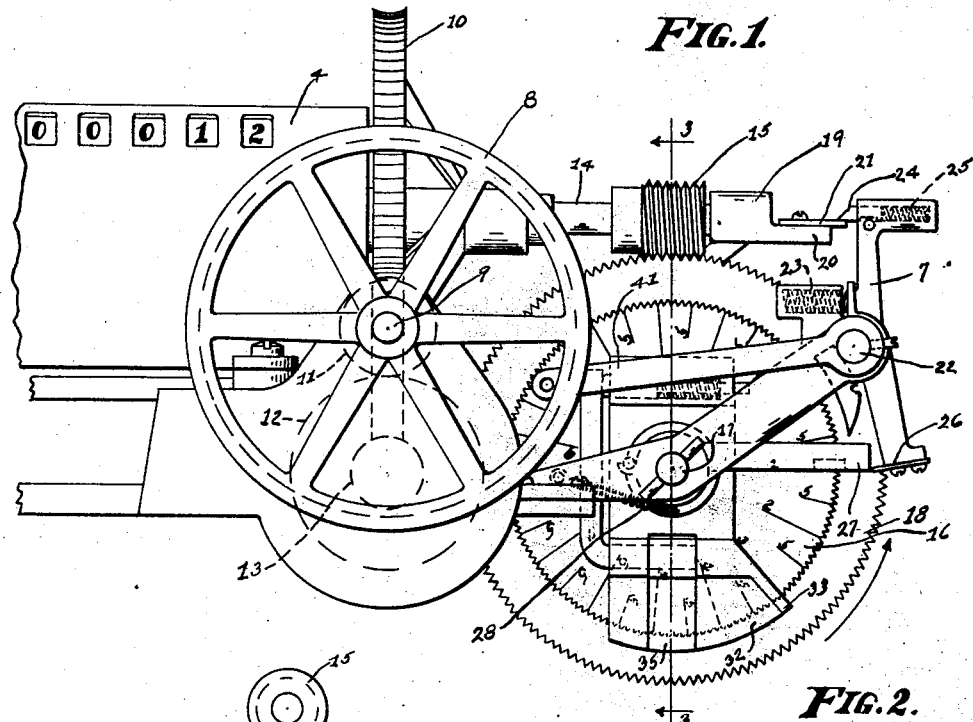
FIG.1.
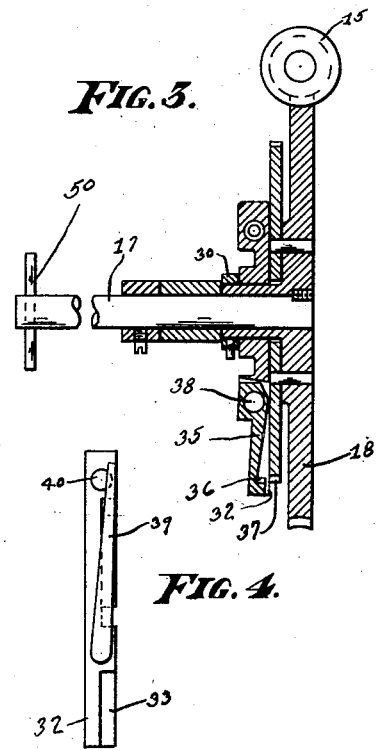
FIG.3.
FIG.4.
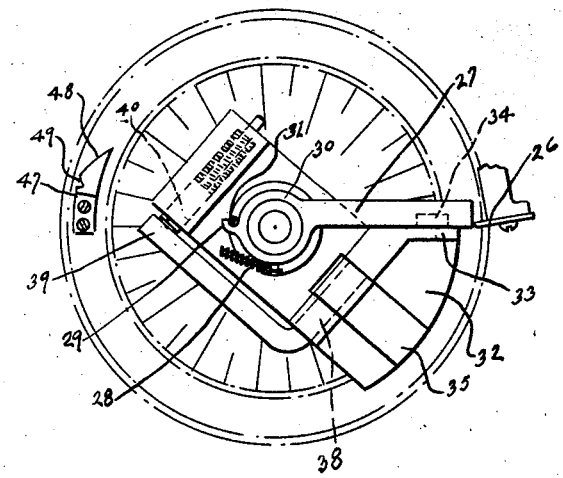
FIG.2.
INVENTOR.
Charley F. Hussey
BY
Erwin, Wheeler & Woolard
ATTORNEYS.

Dec. 7, 1926.
C. F. HUSSEY
1,609,548
MEASURING APPARATUS
Original Filed August 12, 1922    2 Sheets-Sheet 2
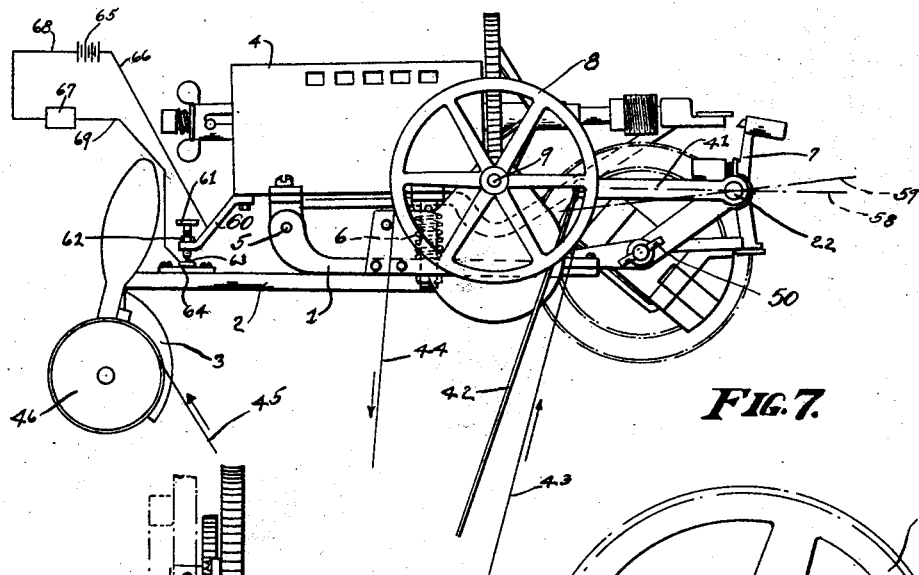
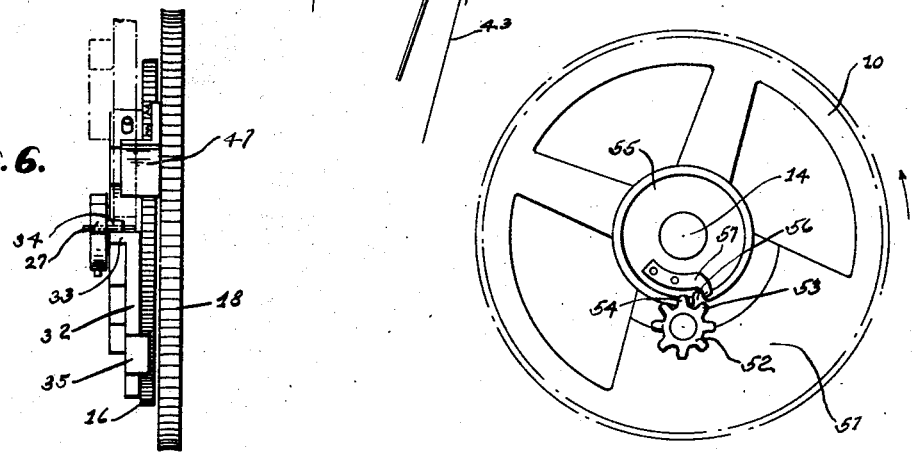
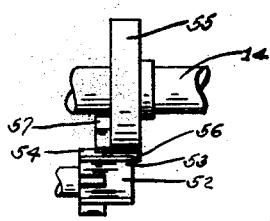
Charley F. Hussey
INVENTOR.
BY
Erwin, Wheeler & Woolard
ATTORNEYS.

Patented Dec. 7, 1926.

1,609,548

UNITED STATES PATENT OFFICE.

CHARLEY F. HUSSEY, OF MILWAUKEE, WISCONSIN.

MEASURING APPARATUS

Application filed August 12, 1922, Serial No. 581,346. Renewed October 28, 1926.

This invention relates to measuring apparatus and is particularly directed to such an apparatus adapted to be applied to a machine to measure the output of such machine.

This invention is an improvement over my former invention disclosed in United States Letters Patent No. 1,502,569, for measuring apparatus, issued July 22, 1924.

Objects of this invention are to provide a measuring apparatus which may be coupled operatively with a machine of any desired speed of production; which is adapted to automatically register the extent of production; which is adapted to automatically control the machine after a predetermined extent of production has occurred and has been registered; and which is adapted to be applied to standard machines in a simple and efficacious manner.

Further objects are to provide a measuring apparatus which is particularly adapted for winding machines to measure the length of yarn passing over such apparatus; which is adapted to cooperate with the passing yarn without necessitating elaborate connections with the mechanism of the machine; and which will register the amount of yarn passed or wound by the machine and will stop the machine after a predetermined amount has been registered.

Further objects are to provide a measuring apparatus in which the setting of the apparatus to function at a predetermined point may be more readily made; in which a direct, ready, and quick reading of the indicating scale may be had; in which the initial setting may be made without the use of a special or outside tool; in which the correct meshing of the gears, during resetting, is assured; and in which the apparatus is complete in itself, both for setting, resetting and functioning.

Further objects are to provide means for coupling the measuring apparatus with one of the controls of the main machine which will stop the machine when a predetermined amount has been registered; which will allow the restarting of the machine after the measuring apparatus has been reset; which may cooperate, or be equipped, with any desired system of alarms; and to provide means for rapidly resetting the machine to permit repeated functioning at predetermined recorded amounts, or which may be quickly reset to function of some new setting.

For the purpose of illustration, the machine has been shown as particularly adapted for cooperation with winding machines.

An embodiment of the invention is shown in the accompanying drawings, in which:—

Fig. 1 is a side elevation of the device with a part of the counter mechanism broken away.

Fig. 2 is a face view of the dial wheel.

Fig. 3 is a section on the line 3—3 of Fig. 1.

Fig. 4 is an edge view of the movably mounted cam illustrating the manual locking means.

Fig. 5 is a view corresponding to Fig. 1 upon a reduced scale and showing the device associated with a winding machine.

Fig. 6 is an edge view of the structure shown in Fig. 2 showing the parts in a slightly varied relative position.

Fig. 7 is a fragmentary view showing the ratchet mechanism of the counter and the biased operating wheel.

Fig. 8 is a view of the structure shown in Fig. 7 taken at right angles to Fig. 7, the operating wheel for the counter being omitted.

The device comprises a framework 1 which is secured to any suitable support 2 attached to the winding machine 3. Upon this framework 1, counter mechanism indicated generally at 4 is pivotally mounted at 5 and spring pressed upwardly by means of the helical spring 6. It is normally retained against upward motion by means of the catch mechanism 7.

A grooved driving wheel 8 is rigidly mounted upon a shaft 9 revolubly carried within a portion of the framework 1. This driving wheel transmits motion to the operating worm wheel 10 of the counter mechanism 4 by means of reduction gears 11 and 12 and the worm wheel 13. The operating wheel 10 of the counter mechanism is rigidly mounted upon a transverse shaft 14 which carries adjacent its outer end a worm 15. The dial wheel is a composite wheel made up of a dial disk 16, provided with a series of peripheral teeth and a worm wheel 18, rigidly secured together. The worm wheel 18 is rigidly mounted upon a shaft 17 mounted in a portion of the framework 1, and meshes with the worm 15 under normal conditions when the parts are in the position shown in Fig. 1.

The framework 1 has a portion 19 forming a socket or bearing for the outer end of the shaft 14, and is provided with an extension 20 projecting outwardly therefrom. A plate 21, of wear resisting material, is mounted upon this extension 20 and cooperates with the latch mechanism.

The latch mechanism 7 comprises, in the main, a lever rigidly secured to a shaft 22 pivotally mounted in an extension of the framework 1. This lever tends to rock in a clockwise direction, being urged by a spring 23 seated within a recess in the framework 1. Its upper end is provided with a movable plunger 24 provided with an upper beveled face and spring pressed outwardly by means of the socketed spring 25. The bottom face of this plunger is flat and contacts with the upper surface of the plate 21 to retain the worm 15 and worm wheel 18, and the worm 13 and worm wheel 10, in operative connection. The lower portion of the latch mechanism is provided with a plate 26 of wear resisting material. The latch mechanism is held in the position shown in Fig. 1, under certain conditions, by means of an arm 27 pivotally mounted upon the shaft 17 and urged into the position shown in Fig. 1 by means of a spring 28 secured to the hub of such lever at one end and to the framework 1 at its other end. This arm 27 is prevented from moving beyond the position shown in Fig. 1 by means of a stop 29 carried by the hub 30 of such trip arm and a pin 31 secured to the framework 1, as may be seen from Fig. 2.

A movable trip lever or finger member 32 is associated with the dial wheel and is provided with an outwardly extending projection 33 adapted to cooperate with an inwardly extending projection 34 formed upon the trip or arm, 27. The portion, 33 of this lever or finger member is relatively thin, as may be seen from Fig. 6, and is adapted to pass behind the inwardly projecting portion 34 of the arm 27 so as to allow the finger member to be moved to its extreme position of adjustment. This finger member is adapted to be locked to the dial wheel in any desired position by means of a dog 35 provided with teeth 36 adapted to cooperate with the teeth 37 formed upon the periphery of the dial disk 16. This dog is rigidly mounted upon a short transverse shaft 38 which, in turn, is pivotally mounted within the lever or finger member and is provided with an angularly extending operating lever 39. The lever 39 is retained in either its inward or outward position by means of a spring pressed plunger 40 mounted within a portion of the lever or finger member as may be seen from Figs. 2 and 4. This retaining operation is facilitated by forming the outer end of the plunger 40 of convex contour, and by forming the inner side of the arm 39 of concave contour.

From the description thus far given, it will be seen that when the projection 33 of the lever or finger member strikes the projection 34 of the arm 27, such arm will be moved upwardly, thereby disengaging the latch mechanism and allowing it to move to the position shown in Fig. 5—the counter mechanism correspondingly rocking upwardly into the position shown in such figure. It will be seen that when the parts are in this position the operative connection between the counter and the driving wheel, and between the driving wheel and the dial wheel is interrupted. Means are also provided for stopping the operation of the winding machine when the latch mechanism operates. This means comprises a lever 41 rigidly secured to the shaft 22 and connected with the control mechanism of the winding machine, as for example, by means of the rod 42 which latter forms a portion of such control mechanism.

The winding machine has not been illustrated in detail as such machine is of well known construction. A convenient way of arranging the yarn is to pass it upwardly, as indicated at 43, around the driving wheel 8, downwardly, as indicated at 44, beneath a portion of the control mechanism (not shown), and upwardly as indicated at 45 to the winding drum, or bobbin, 46 of the winding machine.

In order to facilitate the resetting of the dial wheel at its initial point, and also the resetting of the trip mechanism or latch mechanism, a cam 47 is rigidly secured to the dial wheel, as may be clearly seen in Figs. 2 and 6. This cam is provided with a beveled face 48 adapted to contact with the plate 26 of the catch mechanism, and with a recess 49 adapted to provide a seat for the plates 26 when the dial wheel is at its initial position. It is, therefore, seen that when the dial wheel is reset, as, for example, by means of the manual means 50 (see Figs. 3 and 5), the cam 47 will automatically move the latch mechanism into the position shown in Fig. 1, and the arm 27 will move downwardly to retain the latch mechanism in this position. It will also be seen that when the plate 26 seats within the recess 49, the dial wheel will be held temporarily at its initial position. The manually operable means 50 may comprise a pin passed through the shaft 17, such shaft being conveniently extended so as to position the manually operable means in a convenient place, allowing ready and unhindered access thereto.

In order to provide for the resetting of the worm wheel 10 at its initial position, such wheel is biased conveniently by means of a solid portion 51 formed integrally with such wheel, the solid portions tending to move downwardly to the lowest position. Ratchet mechanism is provided within the counter 4 for stopping the worm wheel 10 in its initial position when such wheel is released from operative engagement with the worm 13. This ratchet mechanism may conveniently comprise a small spur wheel 52 forming a portion of the counter mechanism and provided with alternately long and short teeth, indicated, respectively, by reference characters 53 and 54, see Figs. 7 and 8. A disk 55 is rigidly mounted upon the shaft 14, and is provided with a recess 56 adapted to cooperate with one of the long teeth 53 and allow such wheel to turn a distance corresponding to the pitch of the teeth when such wheel is moved by means of an arm 57 secured upon such disk, and having a downwardly projecting portion cooperating with the teeth. However, when the worm wheel 10 rocks backwardly in an opposite direction from that indicated by the arrow in Fig. 7, the arm 57 will strike one of the teeth and rock one of the long teeth 53 into contact with the face of the disk 55, thereby preventing further backward motion and arresting the worm wheel 10 at its initial position.

The operation of the device is as follows: The movable lever or finger member 32 is set by means of the manually operated dog 35 at any desired position upon the dial wheel. The upper edge of the projection 33 indicating yardage upon the calibrated face of the dial disk. Thereafter, the shaft 17 is rotated by means of the manual means 50 until the beveled face 48 of the cam 47 slides beneath the plate 26 of the catch mechanism and moves the same outwardly, at which time, the arm 27 will move downwardly under the influence of spring 28 into the position shown in Figs. 1 and 2. Thereafter, the worm wheel 10 and the worm 15 are moved downwardly into engagement, respectively, with the worm 13 and worm wheel 18, the spring pressed plunger 24 snapping over the upper face of the plate 21 and retaining the mechanism in this operative position. It is to be noted that the control lever 41 has now moved from the position indicated in Fig. 5 to that indicated in Fig. 1, thereby shifting its center line from the dotted line position 58 to the dotted line position 59 as represented in Fig. 5. This control lever, therefore, lowers the control rod 42 and allows the winding machine to be started. The passing yarn rotates the driving wheel 8 and transmits motion to the counter mechanism and to the dial wheel. When the predetermined number of yards of yarn have passed the driving wheel 8, the projection 33 of the lever or finger member raises the arm 27 and allows the catch mechanism to move into the position shown in Fig. 5, thereby simultaneously stopping the winding machine and disconnecting the driving wheel 8 from operative connection with the counter mechanism and with the dial wheel.

In this invention, it is contemplated providing any type of alarm that may be desired so as to apprise the operator of the fact that the machine has ceased counting and the winding machine has been stopped. This alarm may conveniently comprise an arm 60 secured to the member 4 and provided with an adjustable contact screw 61 provided with a lock nut 62. A stationary contact 63 may be mounted upon an insulating base 64 secured to the support 2 or to any stationary portion such as the frame 1 of the machine. A battery 65 is connected to the arm 60 by means of a lead 66 and to an alarm 67 by means of a lead 68. The other terminal of the alarm 67 is connected with the insulated contact 63 by means of a lead 69. The alarm 67 may be a light, a bell, or other type of signal.

It will thus be seen that a measuring apparatus has been provided which is admirably adapted to cooperate with winding machines to both register the amount of yarn handled by such machine and to stop the operation of the machine when a predetermined amount has been wound. It will also be seen that provision is made for the automatic resetting of the worm wheel 10 and for the ready manual resetting of the dial wheel with the indirect resetting of the latch mechanism.

Throughout the specification and claims the term "yarn" is used not in its limited sense to define simply a textile strand but is used to define any flexible cord-like member such as ordinary yarn, rope, wire, cord or other flexible material of indeterminate length.

I claim:—

1. In a device of the character described, the combination with a worm wheel and worm automatically separable therefrom, of latch mechanism for normally maintaining said worm and worm wheel in engagement and including a trip lever, a lever engaging member freely movable about said worm wheel and normally disengaged therefrom, and means for connecting said members to said worm wheel at a plurality of positions thereabout.

2. In a device of the character described, the combination with a worm wheel and worm automatically separable therefrom, of latch mechanism normally maintaining said worm and worm wheel in engagement, a latch lever for maintaining said latch mechanism in operative position and pivoted about an axis co-axial with the axis of said worm wheel, a trip lever pivoted on an axis co-axial with said worm wheel and having a portion engageable with said latch lever, said trip lever being normally freely rotatable independently of said worm wheel, and means for engaging said trip lever with said worm wheel.

3. A device for measuring the length of yarn and comprising a driving wheel over which yarn passes, counting mechanism having motion transmitting connection with said driving wheel and disconnectable therefrom, a dial wheel having motion transmitting connection with said wheel and disconnectable therefrom, a catch operable to maintain said counting mechanism and dial wheel connected with said motion transmitting connections, a trip lever carried by said dial wheel and engageable with said catch mechanism for the release of the counting mechanism and dial wheel from connection with said motion transmitting connections, and a cam independent of said trip lever and carried by said dial wheel for re-setting said catch to maintain said counting mechanism and dial wheel in connection with said motion transmitting connections.

4. A device for measuring the length of yarn and comprising a driving wheel over which yarn passes, counting mechanism having motion transmitting connection with said driving wheel and disconnectable therefrom, a dial wheel having motion transmitting connection with said wheel and disconnectable therefrom, a catch operable to maintain said counting mechanism and dial wheel connected with said motion transmitting connections, a trip lever carried by said dial wheel and engageable with said catch mechanism for the release of the counting mechanism and dial wheel from connection with said motion transmitting connections, a cam independent of said trip lever and carried by said dial wheel for re-setting said catch to maintain said counting mechanism and dial wheel in connection with said motion transmitting connections, and manual means for re-setting said dial wheel.

5. In a device of the character described, the combination with a worm wheel and worm automatically separable therefrom, of latch mechanism for normally maintaining said worm and worm wheel in engagement, a toothed dial wheel secured to said worm wheel, a latch lever for normally maintaining said latch mechanism in operative position, a trip lever normally freely rotatable about an axis co-axial with the dial wheel and having a portion engageable with said latch lever, and a tooth dog carried by said trip lever and engageable with the teeth of said dial wheel.

6. In a device of the character described, the combination with a worm wheel and worm automatically separable therefrom, of latch mechanism for normally maintaining said worm in engagement with said worm wheel, a latch lever for normally maintaining said latch mechanism in operative position and rotatable about an axis co-axial with said worm wheel, a dial wheel secured to said worm wheel and having a plurality of teeth, a trip lever engageable with said latch lever and freely rotatable about an axis co-axial with said dial wheel, a dog pivotally carried by said trip lever and engageable with the teeth on said dial wheel, and means for alternatively maintaining said dog in its operative or inoperative position.

7. In a device of the character described, the combination with a worm wheel and worm automatically separable therefrom, of latch mechanism for normally maintaining said worm in engagement with the worm wheel, a latch lever for maintaining said latch mechanism in operative position, a dial wheel secured to said worm wheel and having a plurality of teeth, a trip lever freely rotatable about an axis co-axial with the dial wheel, a dog movably carried by said trip lever and having two alternative positions of engagement and disengagement with said dial wheel, and a spring pressed plunger carried by said trip lever and engageable with said dog in each of its positions whereby to maintain said dog operative or inoperative.

8. A device for measuring yarn and adapted to be attached to a winding machine having a stopping lever, a driving wheel over which said yarn passes, trip mechanism operatively connected with said driving wheel, latch mechanism controlled by said trip mechanism and adapted to release said driving wheel from operative connection with said trip mechanism, means for operatively connecting said latch mechanism with said stopping lever, whereby when said latch mechanism releases said wheel from operative connection with said trip mechanism said stopping lever may be operated to stop said winding machine, manual means for re-setting said trip mechanism, and co-operative means formed on said latch mechanism for stopping said trip in its initial position when it is manually re-set.

9. In a device of the character described, having a driving wheel and counter mechanism normally driven thereby and automatically disconnectable therefrom, the combination with latch mechanism for normally maintaining said counter mechanism in connection with said driving wheel, of a trip lever for releasing said latch mechanism, a biased wheel connected with said counter mechanism, and ratchet mechanism associated with said biased wheel for stopping said biased wheel in a predetermined position when said counter mechanism and driving wheel are disconnected.

10. A device for measuring the length of yarn comprising a driving wheel over which said yarn passes, counter mechanism releasably connected with said driving wheel, a dial wheel normally operatively connected with said driving wheel, a trip associated with said dial wheel and normally disconnectable therefrom, manually operable means carried by said trip for locking it to said dial wheel in any desired position of adjustment, and a latch operated by said trip and adapted to release said driving wheel from operative connection with said counter mechanism and dial wheel.

11. A device for measuring the length of yarn comprising a driving wheel over which said yarn passes, counter mechanism releasably connected with said driving wheel, a dial wheel normally operatively connected with said driving wheel, a movable trip associated with said dial wheel, manually operable means carried by said trip for locking it to said dial wheel in any desired position of adjustment, a cam permanently mounted upon said dial wheel in a fixed relative position thereto and independently of said trip, and latch mechanism actuated by said movably mounted trip to sever the operative connection between said driving wheel and said counter mechanism and dial wheel and adapted to be reset by said cam.

12. A device for measuring the length of yarn, said device comprising a driving wheel over which said yarn passes, counting mechanism normally connected with the driving wheel to be driven thereby to register the length of yarn passing over said driving wheel and adapted for automatic disconnection therefrom when a predetermined length of yarn has passed said driving wheel, latch mechanism for normally holding said counting mechanism in connection with said driving wheel and trip mechanism for releasing said latch mechanism, said trip mechanism being normally disconnected from said driving wheel and adapted for connection therewith to be actuated thereby.

13. In a device for measuring yarn including a driving wheel over which the yarn passes and counter mechanism provided with driving means for alternative connection and disconnection with the driving wheel, the combination with a rotatable dial wheel provided with driving means for alternative connection and disconnection with the driving wheel, of latch mechanism for normally maintaining said driving means operative to actuate the counter mechanism and dial wheel, a trip arm for normally maintaining said latch mechanism operative, and a lever operable by said dial wheel adapted to contact with said trip arm, said trip arm having stop mechanism for normally maintaining said arm in latch engagement position.

14. In a device of the character described, the combination with a dial wheel and driving means automatically disconnectable therefrom, of latch mechanism for normally maintaining said driving means connected with said dial wheel and including a latch lever for maintaining said latch mechanism in operative position, trip mechanism rotatable with said dial wheel and disconnectable therefrom, and means for maintaining said trip mechanism operative or inoperative.

15. In a device of the character described, the combination with a manually operable dial wheel and driving means automatically disconnectable therefrom, of latch mechanism for normally maintaining said driving means connected with the dial wheel and including a latch lever for maintaining said latch mechanism in operative position, a trip lever freely movable about said dial wheel and engageable with said latch lever, means for disengageably connecting said trip lever with said dial wheel, and a cam permanently connected with said dial wheel and engageable with said latch mechanism for resetting said latch lever, said cam being provided with stop means adapted to stop the manual rotation of the dial wheel when said latch mechanism is in operative position.

CHARLEY F. HUSSEY.